(12) United States Patent
Moorman et al.

(10) Patent No.: US 9,316,271 B2
(45) Date of Patent: Apr. 19, 2016

(54) ADAPTIVE CONTROL OF A LINEAR ACTUATOR

(71) Applicant: GM GLOBAL TECHNOLOGY OPERATIONS LLC, Detroit, MI (US)

(72) Inventors: Steven P. Moorman, Dexter, MI (US); Brandon Fell, Milford, MI (US); Mateusz Nowak, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/338,997

(22) Filed: Jul. 23, 2014

(65) Prior Publication Data

US 2015/0260238 A1 Sep. 17, 2015

Related U.S. Application Data

(60) Provisional application No. 61/954,263, filed on Mar. 17, 2014.

(51) Int. Cl.
| | |
|---|---|
| *B60W 10/02* | (2006.01) |
| *F16D 48/02* | (2006.01) |
| *F16D 25/06* | (2006.01) |
| *B60W 20/00* | (2006.01) |

(52) U.S. Cl.
CPC ............. *F16D 25/14* (2013.01); *F16D 25/06* (2013.01); *F16D 48/02* (2013.01); *B60W 10/02* (2013.01); *B60W 20/40* (2013.01)

(58) Field of Classification Search
CPC ........ B60W 10/02; B60W 20/40; F16D 48/02
See application file for complete search history.

(56) References Cited

U.S. PATENT DOCUMENTS

2013/0282217 A1* 10/2013 Oel .................. F16D 48/06
701/22

\* cited by examiner

*Primary Examiner* — Tisha Lewis
(74) *Attorney, Agent, or Firm* — Quinn Law Group, PLLC

(57) ABSTRACT

A vehicle or other system includes hydraulic fluid, an actuatable device such as a clutch that includes a linear actuator, e.g., a clutch piston. The linear actuator is moveable via a pressure from the fluid to actuate the actuatable device. A position sensor measures and outputs a position of the linear actuator as a position signal. A controller is programmed to generate increasing and decreasing position-to-pressure (PTP) curves via measurement of the position, at a predetermined time, in response to a series of respectively increasing and decreasing pressure step commands. The controller adjusts the PTP curves using a calibrated set of offsets, locates a PTP point in a hysteresis range between the adjusted PTP curves, and controls the device using the PTP point. The offsets may include a temperature of the fluid, velocity of the linear actuator, and/or an engine speed.

20 Claims, 3 Drawing Sheets

ADAPTIVE CONTROL OF A LINEAR ACTUATOR

CROSS-REFERENCE TO RELATED APPLICATIONS

This application claims the priority benefit of U.S. Provisional Application No. 61/954,263, filed on Mar. 17, 2014, which is hereby incorporated by reference in its entirety.

TECHNICAL FIELD

The present disclosure relates to the adaptive control of a linear actuator.

BACKGROUND

Hydraulic fluid circuits employ valves, pistons, and other various fluid powered components and flow control devices in order to perform useful work in a system. For example, dual clutch transmissions (DCTs) and automated manual transmissions (AMTs) typically employ a linear actuator in the form of a clutch apply piston to engage an input clutch, with a DCT using two such input clutches and an AMT using just one. In either transmission design, a flow control solenoid valve is typically opened to admit fluid into a clutch apply chamber, thereby filling and staging the input clutch prior to its engagement. In a DCT or an AMT, the measured linear position of the linear actuator for each input clutch is used as a feedback variable by a controller, and position control signals are transmitted by the controller to the linear actuator to command a desired clutch pressure. Thus, the input clutches of a DCT or an AMT are typically referred to as "position-controlled" clutches, which may be contrasted with "pressure-controlled clutches" of the type used in automatic transmissions.

SUMMARY

A system is disclosed herein having a linear actuator, such as a clutch apply piston in an example vehicle. A controller estimates an apply pressure for the linear actuator via an adaptive position-to-pressure (PTP) control strategy, which ultimately produces a set of PTP curves that are adjusted for improved accuracy by the controller as set forth herein. That is, the PTP curves, or an associated lookup table used to the same effect, are refined in real time by the controller using a calibrated set of offsets to account for the unique physics of the system, for instance engine speed, fluid temperature, and/or a velocity of the linear actuator in the example vehicle embodiment. The controller is also programmed to account for hysteresis in both an increasing and a decreasing position of the linear actuator so as to locate a PTP point between the PTP curves. Intended results of the disclosed control methodology include the limiting of unintended acceleration events, improvements in shift quality, and establishment of more accurate component pressure limits relative to conventional approaches.

The linear actuator, being a lubricated or wetted component, includes a dynamic fluid seal. Over time, degradation or wear of the dynamic fluid seal, the component being actuated, and environment factors such as changing fluid temperature and/or composition may affect the system and thereby change the actual clutch pressure associated with a commanded position. The controller of the present invention is therefore programmed to adaptively learn the actual position-to-pressure (PTP) performance characteristics of the linear actuator, i.e., an estimated apply pressure corresponding to a given measured position for a range of different positions, doing so without the use of a pressure sensor, such that the unique characteristics of the linear actuator are learned and applied over time.

In an example embodiment, the system includes hydraulic fluid and an actuatable device, with the latter including a linear actuator. The linear actuator is moveable via the hydraulic fluid to actuate the device, for instance a clutch in a vehicle. The system also includes a position sensor such as a Hall effect sensor that measures and outputs a position of the linear actuator as a position signal, and a controller that receives the position signal.

The controller is programmed to transmit a series of respectively increasing and decreasing pressure step commands to the linear actuator, and to generate respective increasing and decreasing PTP curves at a predetermined time using the measured position in response to transmitting the series of respectively increasing and decreasing pressure step commands. The controller also adjusts the increasing and decreasing PTP curves using a calibrated set of offsets, locates a PTP point in a hysteresis range between the adjusted increasing and a decreasing PTP curves, and controls the actuatable device such as the input clutches $CI_1$ or $CI_2$ using the located PTP point.

The above features and advantages and other features and advantages of the present invention are readily apparent from the following detailed description of the best modes for carrying out the invention when taken in connection with the accompanying drawings.

DETAILED DESCRIPTION

Figure 1:
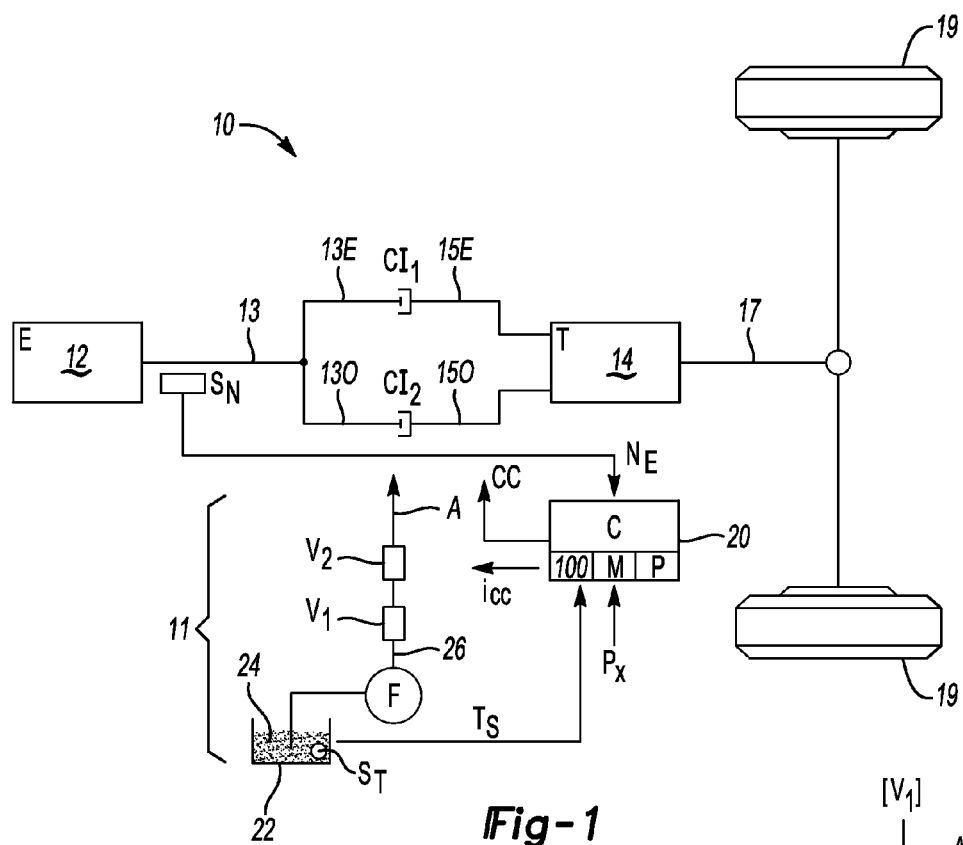
FIG. 1 is a schematic illustration of an example vehicle having a dual clutch transmission (DCT), a linear actuator in the form of a clutch apply piston, and a controller that estimates actuator pressure via an adaptive pressure vs. position strategy as set forth herein.

Referring to the drawings, wherein like reference numbers correspond to like or similar components throughout the several figures, a system in the form of an example vehicle 10 is shown schematically in FIG. 1. The vehicle 10 may include an internal combustion engine (E) 12 or other prime mover that is operatively connected to a transmission (T) 14. The vehicle 10 may further include a fluid circuit 11 having a source F of fluid pressure, for instance an engine-driven and/or auxiliary fluid pump, a fluid sump 22 containing transmission fluid 24, and first and second hydraulic valves $V_1$ and $V_2$, respectively.

In an example embodiment, the first hydraulic valve $V_1$ may be embodied as a pressure control variable force solenoid (PVFS) valve, while the second hydraulic valve $V_2$ may be embodied as a flow control variable force solenoid (QVFS) valve, both of which, as known in the art, are responsive to electrical current signals ($i_{CC}$) from a controller (C) 20. When open, fluid circulates under pressure from the source F into the transmission 14 and/or to actuatable devices, shown here as example input clutches $CI_1$, $CI_2$, with the direction of flow generally indicated by arrow A. The respective first and second hydraulic valves $V_1$ and $V_2$ are in fluid communication with the source F via a conduit 26, for instance a length of hose or tubing, along with all required hydraulic fittings.

Figure 1A:
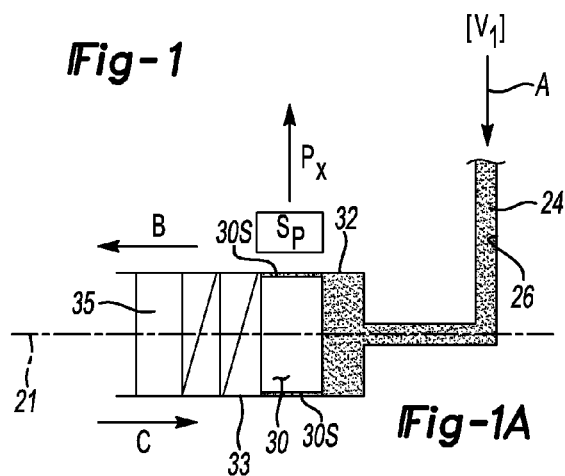
FIG. 1A is a schematic illustration of an example linear actuator in the form of a position-controlled clutch apply piston usable with the vehicle of FIG. 1.

The vehicle 10 of FIG. 1 includes various fluid controller and fluid powered components as explained below. The vehicle 10 therefore serves as a non-limiting example system suitable for application of a method 100 for adaptively learning unique position-to-pressure (PPT) characteristics of a linear actuator 30, a non-limiting example of which is shown in FIG. 1A as a clutch apply piston suitable for applying and releasing the input clutches $CI_1$ and $CI_2$. However, the linear actuator 30 of FIG. 1A may be any linear actuator that translates along an axis of translation 21 as shown in FIG. 1A, and that actuates a given device, for instance a piston of a hydraulic feed mechanism, press, or lift of the types typically used on a plant floor, or any other hydraulic system utilizing such a linear actuator. For illustrative consistency, the vehicle 10 of FIG. 1 will be discussed hereinafter without limiting the inventive scope to vehicular embodiments.

In all embodiments, the controller 20 of FIG. 1 is in communication with the fluid circuit 11 and with at least one position-controlled actuatable device, shown in FIG. 1 as the input clutches $CI_1$ and $CI_2$. As will be appreciated by those having ordinary skill in the art, when the transmission 14 is configured as a dual clutch transmission (DCT), particularly of the dry or non-lubricated variety, the input clutches $CI_1$ and $CI_2$ are used to select the respective evenly-numbered and oddly-numbered gear sets of the transmission 14, with a reverse gear typically selected via the same input clutch $CI_2$ as the evenly-numbered gear sets. An automated manual transmission (AMT) is similar, but uses only one of the input clutches $CI_1$ or $CI_2$ for all gear sets. For the DCT embodiment of the transmission 14, an output shaft 13 from the engine 12 includes an even shaft 13E and an odd shaft 13O, each respectively connected to an even and odd input member 15E, 15O of the transmission 14. Output torque from the transmission 14 is delivered via an output member 17 to the drive wheels 19 of the vehicle 10.

While automatic transmissions tend not to use position control for its various clutches, nothing precludes application of the present method 100 to such a transmission if position-controlled clutches or other linearly actuated devices were to be implemented. As is known in the art, and as used herein, the term "position control" refers to any control scheme that commands a specific linear position from a translatable linear actuator with respect to a stationary reference point, such as a clutch apply piston of the input clutches $CI_1$ and $CI_2$ with respect to any clutch housing or clutch apply chamber within which the linear actuator moves, in order to request a desired pressure, with the corresponding pressure typically extracted from a lookup table indexed or referenced by a measured position of the linear actuator.

A static PTP lookup table may work reasonably well when all components are new and performing as expected. Over time, however, age and wear can alter the PTP relationship for a given linear actuator. The present approach is intended to account for this degradation, as well as provide hysteresis-based correction to any adapted lookup tables to optimize PTP accuracy in advance of a control action, such as a shift of the transmission 14. An example of the method 100 for accomplishing the desired results is set forth below with reference to FIGS. 3A-C.

Referring briefly to FIG. 1A, a linear actuator 30 is shown as an example clutch apply piston suitable for actuation of either of the input clutches $CI_1$ or $CI_2$ shown in FIG. 1. For instance, the first hydraulic valve $V_1$ of FIG. 1 may feed the fluid 24 into the conduit 26 as indicated by arrow A. Translation of the linear actuator 30 in the direction of arrow B along axis 21 applies force to a clutch pack (not shown) to apply the input clutch $CI_1$ or $CI_2$. A return spring 33 may react against a stationary member 35 to return the linear actuator 30 in the direction of arrow C to its initial position when flow (arrow A) into the conduit 26 is terminated by the control signals (arrow $i_{CC}$) from the controller 20, as shown in FIG. 1.

In order to measure the position of the linear actuator 30 of FIG. 1A, a position sensor ($S_P$) such as a Hall effect sensor is positioned with respect to the linear actuator 30, e.g., connected to a fixed structure (not shown) external to or within the clutch apply chamber 32. The linear actuator 30 translates along the axis 21 with respect to the position sensor ($S_P$), with a dynamic seal 30S in sliding contact with an inside wall of the clutch apply chamber 32, with the position sensor ($S_P$) measuring the position (arrow $P_X$) of the linear actuator 30 within the clutch apply chamber 32. The measured position (arrow $P_X$) is output as a signal from the position sensor $S_P$ and transmitted to the controller 20, for instance over a controller area network bus, a serial bus, wirelessly, or via another suitable connection, and later used in the execution of the method 100 shown in FIGS. 3A-C.

Figure 4:
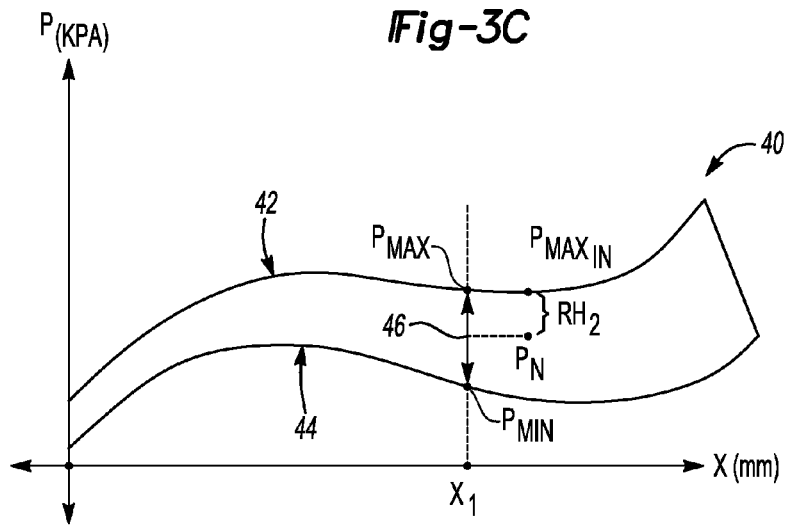
FIG. 4 is a graphical depiction of an example PTP curve for the linear actuator shown in FIG. 1A, with an example hysteresis range determined as part of the method shown in FIGS. 3A-C.

Referring again to FIG. 1, in order to conduct the method 100, the controller 20 creates or generates and periodically updates respective increasing and decreasing position-to-pressure (PTP) curves 40 at a predetermined time using measured actuator position, with a non-limiting example shown in FIG. 4. This is done in response to transmitting the series of respectively increasing and decreasing pressure step commands. Using the PTP curves 40 of FIG. 4, or an equivalent lookup table, the controller 20 of FIG. 1 ultimately estimates the clutch pressure for the input clutches $CI_1$ and $CI_2$, applies offsets to account for physics of the vehicle 10, and accounts for hysteresis within the system to accurately determine actual PTP performance of the linear actuator 30. Specifically, the controller 20 locates a particular PTP point in a hysteresis range between adjusted increasing and decreasing PTP curves as explained below.

The controller 20 shown schematically in FIG. 1 may be embodied as a computer device that includes elements such as a processor (P), memory (M) including but not limited to read only memory (ROM), random access memory (RAM), electrically-programmable read-only memory (EPROM), flash memory, etc., and any required hardware devices. Hardware devices of the controller 20 may include a high-speed clock (not shown), timers, analog-to-digital (A/D) circuitry, digital-to-analog (D/A) circuitry, digital signal processor logic, and input/output devices, as well as other signal conditioning and/or buffer circuitry as needed. In the execution of the method 100, as will now be described with reference to FIGS. 3A-C and 4, the controller 20 receives the measured position (arrow $P_X$) from the position sensor(s) $S_P$ of FIG. 4, along with a fluid temperature ($T_S$) from a temperature sensor ($S_T$) positioned in or in proximity to the fluid sump 22, and a rotational speed of the output shaft 13 from a speed sensor $S_N$, i.e., engine speed (arrow $N_E$). As part of any control action, the controller 20 may ultimately transmit clutch commands (arrow CC) to the input clutch $CI_1$ or $CI_2$ to execute a shift or maintain a fixed gear state as needed.

Figure 3A:
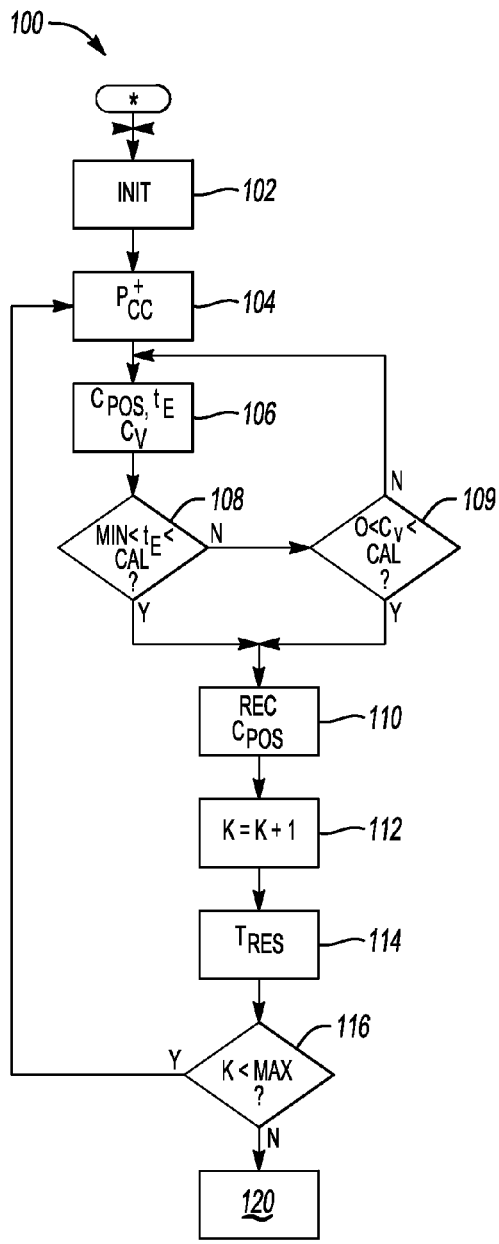
FIGS. 3A-3C collectively form a graphical flow chart describing an example method for learning the actual position-to-pressure (PTP) characteristics of the linear actuator shown in FIG. 1A, and for subsequently estimating the pressure during control of the linear actuator.

Referring to FIG. 3A, the method 100 is executed by the controller 20 of FIG. 1 to estimate the clutch pressure to be applied by the linear actuator 30 of FIG. 1A. In other words, the vehicle 10 of FIG. 1 lacks a pressure transducer, and thus clutch pressure is estimated as part of the overall control of a shift or other clutch actuation event. As noted above, in an example embodiment the linear actuator 30 of FIG. 1A is a clutch apply piston, and the pressure being estimated is the clutch apply pressure. The controller 20 thus learns the actual PTP characteristics for the linear actuator 30 over the life of the linear actuator 30, and periodically accounts for variation in conditions via calibrated offsets for a predetermined set of factors such as engine speed ($N_E$), sump temperature ($T_S$), and/or velocity of the linear actuator. The controller 20 then applies hysteresis control logic, as explained with reference to FIG. 3A, so as to estimate the clutch pressure as it exists between limits imposed by increasing and decreasing PTP curves 42 and 44 respectively, as shown in FIG. 4, with double-headed arrow 46 indicating the range between the increasing and decreasing PTP curves 42 and 44. This entails locating a PTP point in a hysteresis range between the adjusted increasing and a decreasing PTP curves. For illustrative clarity, the method 100 is artificially divided into separate FIGS. 3A-C. However, the method 100 may be run in its entirety such that FIG. 3-A comprise a single logical process.

The method 100 initiates at step 102. Entry conditions are verified at this step, such as that the transmission 14 of FIG. 1 is in park, the engine 12 is off, and the sump temperature (Ts) is in a calibrated range. At step 102, any clutch apply forks in the example of a DCT may be neutralized or commanded off by the controller 20, and a maximum control current may be commanded of the second hydraulic valve $V_2$, e.g., the QVFS valve noted above. Thus, control of fluid 24 into the clutch apply chamber 32 of FIG. 1A via the conduit 26 is performed via the first hydraulic valve $V_1$, for instance a pressure control solenoid valve. The method 100 then proceeds to step 104.

Figure 2:
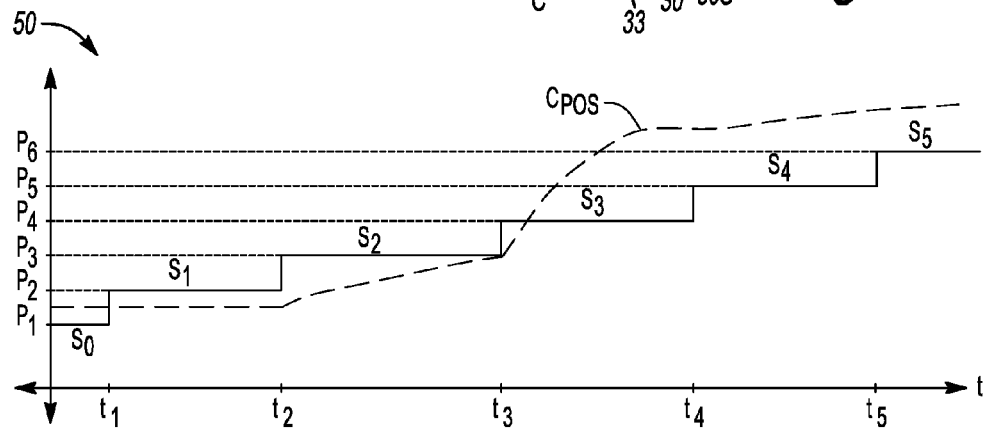
FIG. 2 is a time plot of changing pressure commands, with pressure depicted on the vertical axis and time depicted on the horizontal axis.

At step 104, the controller 20 transmits a series of respectively increasing and/or decreasing pressure step commands to the linear actuator 30, depending on which direction is being evaluated first. Step 102 may include first commanding a calibrated increase in pressure ($P^+_{CC}$) to the linear actuator 30 for an example evaluation of an increasing direction. Referring briefly to FIG. 2, a time plot 50 of pressure step commands S0-S5 may be prerecorded in memory M of the controller 20 for this purpose. Time (t) is plotted on the horizontal axis and the magnitude of the pressure steps S0-S5 is plotted on the vertical axis, with the example pressure steps S0-S5 having corresponding pressure levels P1-P6. For instance, between $t_0$ and $t_1$, the pressure fed to the linear actuator 30 via the first hydraulic valve $V_1$ may be 0 kilopascal (kPa), stepping up to 500 kPa at $t_1$, to 1000 kPa at $t_2$, and so forth, in example 500 KPa increments or some other suitable pressure increment. These increments need not be the same, and may, for instance, decrease as time advances, for instance with multiple steps of 500 kPa followed by a smaller step of 250 kPa, followed by a smaller step of 200 kPa. With each step, the controller 20 may start a timer of the controller 20 and calculate the clutch velocity ($C_V$) with which the linear actuator 30 moves in response to a given commanded pressure step.

Step 106 entails monitoring the received position signals (arrow $P_X$) from the position sensor $S_P$ of FIG. 1A to determine the clutch position ($C_{POS}$), i.e., the linear position of the linear actuator 30, in response to the commanded pressure steps from step 104. Thus, steps 104 and 106 are intended to run concurrently, as the inflection point of the linear actuator 30 at the start of each movement is tracked for each pressure step S0-S5 of FIG. 2. Step 106 therefore includes processing the received position signals (arrow $P_X$) and an elapsed time ($t_E$) since the start of each step to calculate the clutch velocity ($C_V$). The method 100 then proceeds to step 108.

At step 108, the controller 20 of FIG. 1 may determine whether the elapsed time ($t_E$) from step 106 is less than a maximum calibrated time limit (CAL) and greater than a calibrated minimum amount of time (MIN), the latter being a short duration needed for processing of the step command. If this condition is not true, the method 100 proceeds to step 109. The method 100 otherwise proceeds to step 110.

Step 109 includes determining whether the calculated clutch velocity ($C_V$) is positive, i.e., that the linear actuator 30 is moving in response to a given commanded pressure step, and is less than a calibrated maximum speed, i.e., $0 < C_V < CAL$. If so, the method 100 proceeds to step 110, with step 106 otherwise repeated.

At step 110, the controller 20 records the corresponding position of the linear actuator 30 in memory M. Referring again to FIG. 2, the changing clutch position is shown as trace $C_{POS}$. In this example, the commanded pressure step S1 at time $t_1$ produces no discernable response in clutch position ($C_{POS}$). The next commanded pressure step S2 at $t_2$, however, produces a clear position response, as clutch position ($C_{POS}$) gradually changes between $t_2$ and $t_3$ before leveling off. The exit condition of step 109 looks for this leveling off via comparison of the clutch velocity ($C_V$), which is the rate of change of the linear position of the linear actuator 30, to a calibrated rate. If the rate is too slow relative to this calibrated rate, or if at step 108 the timer expires, the corresponding clutch position ($C_{POS}$) is recorded.

At step 112, an index (K) is incremented such that K=K+1. Such an index (K) is a counter value that may reside in logic of the controller 20. The method 100 proceeds to step 114 when the index (K) has been incremented.

Step 114 includes resetting the timer, as abbreviated $T_{RES}$ in FIG. 3A, that was started at step 106, which is performed in preparation for a subsequent step command. The method 100 proceeds to step 116 when the timer has been reset.

Step 116 entails comparing the index (K) to a calibrated maximum value to determine if further iterations of steps 102-114 are required. The index K corresponds to the number of required pressure steps, and is therefore a calibrated number. For example, if positive pressure steps S1-S5 and an initial zero pressure step S0 are needed as shown in the simplified example of FIG. 2, then K=5. The method 100 returns to step 102 if the expected K pressure steps have not been completed, and proceeds in the alternative to step 120 when the K steps have been completed. Proceeding to step 120 indicates that an increasing curve such as the increasing PTP curve 42 of FIG. 4 has been determined.

Steps 102-116 may be performed relatively infrequently, such as once every N key cycles, where N is greater than 1000 key cycles in an embodiment, or where N=5000, in order to build the baseline used for the curves 40 of FIG. 4. The increasing and decreasing PTP curves 42 and 44 of FIG. 4 are similar, but typically are not exactly the same, particularly in the example embodiment of a linear actuator 30 in the form of a clutch apply piston as shown in FIG. 1A. That is, fluid dynamics occurring in a given clutch can be complex, and the manner in which a given clutch seal flexes, compresses, or expands in one direction of translation relative to another could lead to a slight variance in the shape of the increasing and decreasing PTP curves 42 and 44. Thus, the method 100 executes substantially similar steps to steps 102-116 to build the decreasing PTP curve 44. This will now be explained with reference to FIG. 3B.

Figure 3B:
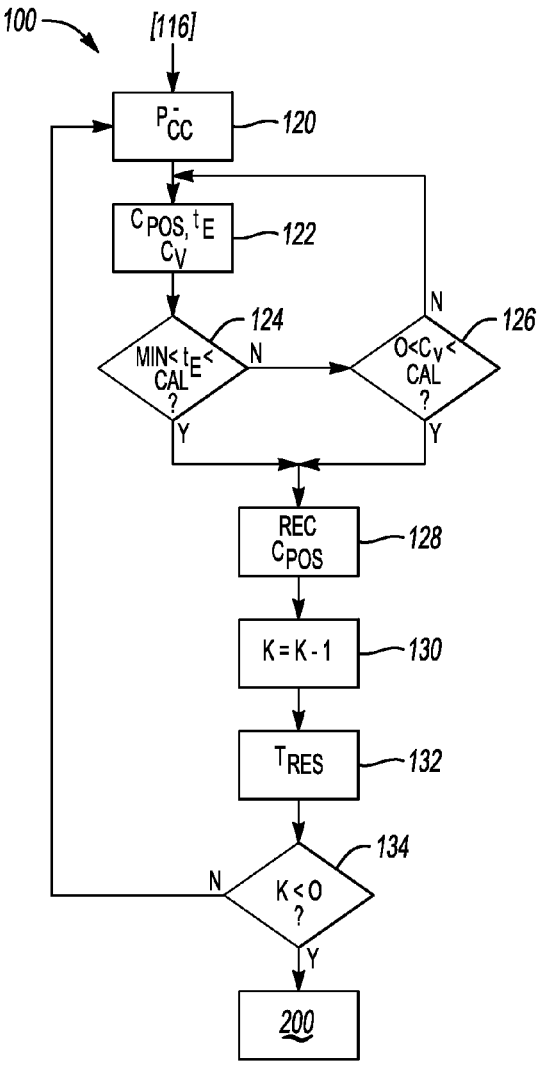

At step 120 of FIG. 3B, the controller 20 of FIG. 1 starts a timer and commands a calibrated decrease in pressure ($P^-_{CC}$) to the linear actuator 30 of FIG. 1A, i.e., evaluation of the decreasing direction. Steps S0-S5 of the time plot 50 of FIG. 4 are reversed relative to step 104, such that the commanded pressure decreases in a stepped manner back toward zero. As with the development of the increasing curve 40 of FIG. 4, steps 120-134 of FIG. 3B occur for each commanded pressure step S1-S5. Thus, after commanding the last pressure step S5, the method 100 proceeds to step 122.

At step 122, the controller 20 of FIG. 1 monitors the position signals (arrow $P_X$) from the position sensor $S_P$ shown in FIG. 1A so as to determine the response in clutch position ($C_{POS}$) to a given pressure step. As with step 106, step 122 includes processing the received position signals (arrow $P_X$) and the elapsed time ($t_E$) since the start of each step to determine the clutch velocity ($C_V$). The method 100 then proceeds to step 124.

At step 124, the controller 20 next determines whether the elapsed time ($t_E$) is less than a maximum calibrated time limit (CAL) and greater than a calibrated minimum amount of time (MIN). The method 100 proceeds to step 126 if this condition is not true. Otherwise, the method 100 proceeds to step 128.

Step 126, as with step 109 described above, includes determining whether the clutch velocity ($C_V$) is positive, i.e., the linear actuator 30 is responding via movement to a commanded pressure step, and less than a calibrated maximum, i.e., $0<C_V<CAL$. If so, the controller 20 recognizes that the position response has sufficiently decayed, and the method 100 proceeds to step 128. Step 122 is otherwise repeated.

At step 128, the controller 20 as shown in FIG. 1 records the corresponding clutch position ($C_{POS}$) in memory M and proceeds to step 130, with clutch position ($C_{POS}$) shown schematically in FIG. 4 as noted above.

At step 130, an index (K) is decreased by an integer value of 1, i.e., K=K−1. This step is analogous to step 112 described above, except that the index K starts at a maximum, e.g., K=5 as in the example of FIG. 4, and then counts backward to 0. The method 100 proceeds to step 132 when the index K as been decremented.

Step 132 includes resetting the timer ($T_{RES}$) that was started at step 120, which is performed in preparation for a subsequent pressure step command. The method 100 proceeds to step 134 when the timer has been reset.

Step 134 entails comparing the value of the index (K) to zero to determine if further iterations of steps 120-134 are required. The method 100 repeats step 120 if K exceeds zero, meaning steps must still be evaluated, and proceeds in the alternative to step 200 when all K steps of evaluation have been completed. Proceeding to step 200 indicates that the increasing PTP curve 42 as well as the decreasing PTP curve 44 of FIG. 4 has been determined. The entirety of FIGS. 3A-3B may take a fair amount of calculation time to complete, and thus may be completed when the vehicle 10 is turned off. Also, as the build of the raw curves used for constructing the curves 40 is needed only periodically, such as once every 1000 or 5000 key cycles, the impact on the driver of running steps 102-134 is expected to be negligible. The method 100 can then proceed with the hysteresis control portions of the intended approach, which occur continuously in real time to ensure the most accurate use of the information in the developed curves 40.

Figure 3C:
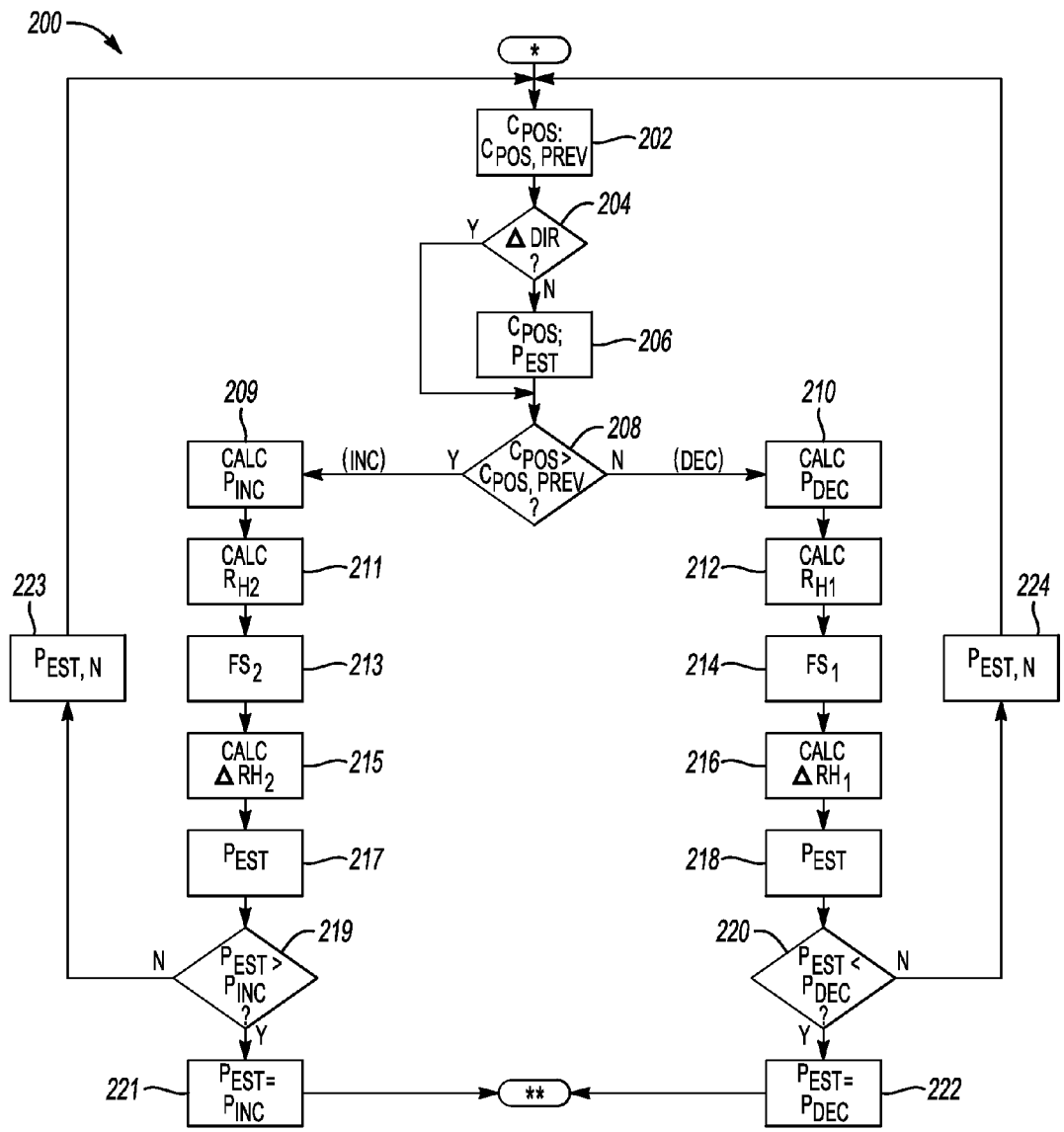

Referring to FIG. 3C, steps 200-222 of the method 100 are intended to allow the controller 20 to adjust the increasing and a decreasing PTP curves using a calibrated set of offsets so as to account for conditions such as engine speed, temperature, and velocity. The calibrated offsets are intended to improve the accuracy of the curves 40 developed in FIGS. 3A and 3B. That is, in the development of the curves 40 of FIG. 4, the engine 12 of FIG. 1 was off and temperature was within a calibrated range, as explained in step 102 of FIG. 3A. Such conditions are ideal, and therefore offsets are made to account for temperature changes, centrifugal effects, velocity of the linear actuator 30, viscous friction acting on seals of the linear actuator, and the like.

Additionally, it is recognized herein, and accounted for in the remaining steps of the method 100, that the actual operating point is not likely to be located on either PTP curve 40 or 42, but rather somewhere in between. The PTP curves 40 and 42 are thus treated as something akin to sliding limits. Again, as there is no way to directly measure the pressure acting on the linear actuator 30 in the vehicle 10 of FIG. 1, the pressure must be estimated from measured position. Thus, the method 100 tracks precisely where, between the PTP curves 42 and 44 of FIG. 4, the linear actuator 30 is actually operating so as to further optimize control of any system using the linear actuator 30.

At step 202 of FIG. 3C, the controller 20 reads the clutch position ($C_{POS}$) and compares this value to a previous clutch position ($C_{POS, PREV}$), i.e., a clutch position read in an immediately prior iteration. The method 100 then proceeds to step 204.

Step 204 entails determining, via the controller 20, where the commanded position from step 202 results in a change in the direction of motion (Δ DIR) of the linear actuator 30 that is opposite the direction of motion of the prior position. If so, the method 100 proceeds to step 206. If the direction has not changed, the method 100 proceeds in the alternative to step 208.

Step 206 entails recording the current clutch position ($C_{POS}$) and, from the previously developed PTP curves 42 and 44 of steps 102-134, the estimated clutch pressure ($P_{EST}$) for that position as reference values. The method 100 then proceeds to step 208.

Step 208 includes determining whether the commanded position from step 202 exceeds the previously commanded position from the immediately prior iteration of step 208. If not, the controller 20 recognizes that clutch position ($C_{POS}$) is decreasing, i.e., PTP curve 44 of FIG. 4 is the relevant curve, and proceeds to step 210. Otherwise, the controller 20 recognizes that clutch position ($C_{POS}$) is increasing, i.e., PTP curve 42 of FIG. 4 is the relevant curve, and proceeds in the alternative to step 209.

Hysteresis Control for Increasing Position

Steps 209-223 refer to hysteresis compensation during conditions in which clutch position ($C_{POS}$) is increasing, i.e., moving in an apply direction of arrow B in FIG. 1A. Thus, for illustrative clarity, oddly numbered method steps 209-223 will be discussed apart from evenly numbered steps 210-224, which pertain to hysteresis compensation during conditions in which clutch position ($C_{POS}$) is decreasing, i.e., moving in the release direction of arrow C in FIG. 1A. Thus, the terms "increasing" and "decreasing" refer to the changing position with respect to a nominal value such as 0 (fully released), with positions approaching the nominal value being "decreasing" and positions moving away from the nominal value being "increasing".

Step 209 includes applying a set of offsets to PTP curve 42 of FIG. 4 to more accurately determine increasing pressure when the position of the linear actuator 30 is increasing. Step 209 may include referencing a calibrated lookup table in memory M that is indexed by, for example, a rotational speed of the engine 12, the fluid or sump temperature Ts, and/or the velocity of the linear actuator 30 calculated as a function of the commanded flow rate. For instance, for a commanded flow rate Q and a linear actuator 30 having a known cross-sectional area A, the clutch velocity $C_V=Q/A$. These effects will not change much if at all over time, and thus calibrated offsets may be used to compensate.

As part of step 209, the ECM of FIG. 1 could output the known speed of the engine 12 to the TCM, the sensor $S_T$ may transmit the sump temperature $T_S$ to the TCM, and the TCM may calculate the clutch velocity ($C_V$), any or all of which may be used to adjust the PTP curve 42 of FIG. 4 upward or downward as needed. Step 209 thus provides an initial correction to any raw curves used to build curves 40, i.e., in steps 102-134 of FIGS. 3A-3B, to account for actual conditions. The method 100 then proceeds to step 211.

At step 211, the controller 20 next calculates a hysteresis range $R_{H2}$ as the difference between the increase in pressure ($P_{INC}$) calculated and compensated at step 209 and the reference estimated clutch pressure ($P_{EST}$) recorded at step 206, with the "2" in "$R_{H2}$" referring solely to the hysteresis range determined when position is increasing. This hysteresis range is indicated as $R_H$ in FIG. 4. As noted above, the actual operating point will vary between the extremes of the curves 42 and 44. This occurs within the hysteresis range $R_H$. Thus, for movement in the increasing direction, an upper boundary is provided by the increasing PTP curve 42. The method 100 proceeds to step 213 when the hysteresis range $R_{H2}$ has been determined.

At step 213, the controller 20 next extracts, from a lookup table, a calibrated scale factor ($FS_2$) to apply to the hysteresis range $R_{H2}$ of step 211. The lookup table may be indexed by the commanded change in clutch position from the previous value. For instance, a first row of the lookup table may include position change ($\Delta x$) values, e.g., 0.01 mm, 0.03 mm, 0.05 mm, 0.5 mm, 0.8 mm, 1 mm, etc., and corresponding scale factors, e.g., 0.2, 0.3, 0.5, 0.7, 1, 1, etc., where a value of 0.2 represents a 20% change in the hysteresis range being added to the estimated clutch pressure. The values in the scale factor table may be relatively small depending on the amount of position change.

Step 213 accounts for viscous friction in the linear actuator 30. As is known in the art, a high amount of friction is typically present in a linear actuator, particular those used as hydraulic clutch actuators. In FIG. 4, by way of example, 600-700 kPa may separate PTP curve 42 from PTP curve 44. With respect to the clutch seal 30S of FIG. 1A used to form a dynamic seal between the linear actuator 30 and the clutch apply chamber 32, very small changes in clutch position only serve to deflect or compress the seal 30S, without actually moving the linear actuator 30 enough to change the clutch pressure. Step 213 is intended to finely tune the control of the linear actuator 30 with this effect in mind. The method 100 then proceeds to step 215.

At step 215, the controller 20 calculates a hysteresis delta ($\Delta RH_2$) by multiplying the hysteresis range ($R_{H2}$) from step 211 by the scale factor from step 213, i.e., $\Delta R_{H2}=FS_2 \cdot R_{H2}$. The method 100 then proceeds to step 217.

Step 217 of the method 100 entails calculating the estimated clutch pressure ($P_{EST}$). Step 215 may include adding the reference estimated clutch pressure from step 206 to the hysteresis delta ($\Delta RH_2$) of step 213. Once calculated, the method 100 proceeds to step 219.

At step 219, the controller 20 determines if the value calculated at step 217 exceeds the increasing pressure ($P_{INC}$) limits imposed by PTP curve 42 of FIG. 4, i.e., the original baseline curve adjusted via the offsets of step 209. Step 221 is executed if the estimated clutch pressure ($P_{EST}$) from step 217 exceeds the limits. Step 223 is executed if the alternative is true.

At step 221, the controller 20 controls the actuatable device using the located PTP point, i.e., uses the limit from the increasing PTP curve 42 of FIG. 4. For instance, at position $x_1$ of FIG. 4, with an initial max/min range of $P_{MAX}$ adjusted by the offsets at step 209 to $P_{MAX, N}$, the value of $P_{MAX, N}$ is used as the estimated clutch pressure in subsequent control of the linear actuator 30 of FIG. 1A. The method 100 is complete (**), starting anew with step 200. Once every N key cycles, steps 102-134 may be repeated to construct a new baseline set of the PTP curves 42, 44 as noted above.

Step 223 includes finding a new estimated clutch pressure, i.e., the point $P_N$ of FIG. 4. To do this, the controller 20 may add the initial reference pressure from step 206 to the hysteresis delta $\Delta RH_2$ of step 215, i.e., $P_{EST,N}=P_{EST}+\Delta RH_2$. This value may be used in the subsequent control of the linear actuator 30 of FIG. 1A. Control actions taken by the controller 20 of FIG. 1 using estimated clutch pressure are many, as will be understood by those having ordinary skill in the art, including executing a requested shift of the transmission 14. Thus, the controller 20 locates a PTP point in the hysteresis range between the adjusted increasing and decreasing PTP curves.

Hysteresis Control for Decreasing Position

The methodology for handing decreasing position mirrors steps 209-223 for increasing position. Thus, steps 210-224 describe hysteresis compensation during conditions in which clutch position ($C_{POS}$) is decreasing.

Step 210 includes applying a set of offsets to PTP curve 42 of FIG. 4 to more accurately determine decreasing clutch pressure ($P_{DEC}$) when the position of the linear actuator 30 is decreasing. Step 210 is analogous to step 209, and thus may include referencing a calibrated lookup table in memory M of the controller 20 shown in FIG. 1 indexed by a rotational speed of the engine 12, the sump temperature Ts, and/or the velocity of the linear actuator 30 calculated as noted above in step 209. The method 100 then proceeds to step 212.

At step 212, the controller 20 calculates a hysteresis range $R_{H1}$ as the difference between the decrease in pressure ($P_{DEC}$) calculated and compensated at step 210 and the reference estimated clutch pressure ($P_{EST}$) recorded at step 206, with the "1" in "$R_{H1}$" referring to the hysteresis range determined when position is decreasing. This hysteresis range is indicated as $R_H$ in FIG. 4. As noted above, the actual operating point will vary between the extremes of the curves 42 and 44 in FIG. 4 within the hysteresis range $R_H$. Thus, for movement in the decreasing direction, a lower boundary is provided by the PTP curve 44 of FIG. 4. The method 100 proceeds to step 214 when the hysteresis range $R_{H1}$ has been determined.

At step 214, the controller 20 extracts a calibrated scale factor ($FS_1$) to apply to the hysteresis range $R_{H1}$ of step 212. The lookup table, as explained above with reference to step 213, may be indexed by the commanded change in pressure from the previously commanded pressure value. Step 214 thus accounts for viscous friction in the linear actuator 30 in the same manner as step 213. The method 100 then proceeds to step 216.

At step 216, the controller 20 next calculates a hysteresis delta ($\Delta RH_1$) for the decreasing direction of movement by multiplying the hysteresis range ($R_{H1}$) from step 212 by the scale factor from step 214, i.e., $\Delta R_{H1}=FS_1 \cdot R_{H1}$. The method 100 then proceeds to step 218.

Step 218 of the method 100 entails calculating the estimated clutch pressure ($P_{EST}$). Step 218 may include adding the reference estimated clutch pressure from step 206 to the hysteresis delta ($\Delta RH_1$) of step 214. Once calculated, the method 100 proceeds to step 220.

At step 220, the controller 20 of FIG. 1 next determines if the value calculated at step 218 is less than the decreasing pressure ($P_{DEC}$) limits imposed by PTP curve 44 of FIG. 4, i.e., the original baseline curve adjusted via the offsets of step 210. Step 222 is executed if the estimated clutch pressure ($P_{EST}$) from step 218 is less than these limits. Step 224 is executed if the alternative is true.

At step 222, the controller 20 controls the actuatable device using the located PTP point, i.e., using the limit from the decreasing PTP curve 44 of FIG. 4. For instance, at position $x_1$ of FIG. 4, with an initial minimum of $P_{MIN}$ adjusted by the offsets at step 210 to $P_{MIN,N}$, the value of $P_{MIN,N}$ is used as the estimated clutch pressure ($P_{EST}$) in subsequent control of the linear actuator 30 of FIG. 1A. The method 100 is complete (**), starting anew with step 200.

Step 224 includes finding a new estimated clutch pressure, i.e., the point $P_N$ of FIG. 4. To do this, the controller 20 may add the initial reference pressure from step 206 to the hysteresis delta from step 216, i.e., $P_{EST,N}=P_{EST}+\Delta RH_1$. This value may be used in the subsequent control of the linear actuator 30 of FIG. 1A. Control actions taken by the controller 20 of FIG. 1 using estimated clutch pressure are many, as will be understood by those having ordinary skill in the art, including executing a requested shift of the transmission 14.

Using the method 100 as set forth above in the control of a position-controlled clutch piston, e.g., the example linear actuator 30 of FIG. 1A, is intended to eliminate the required space and cost of pressure transducers. For an example DCT embodiment of the transmission 14 of FIG. 1, for instance, two different input clutches $CI_1$ and $CI_2$ are used, and therefore two of the configurations shown in FIG. 1A are needed. As a result, every vehicle 10 manufactured would require two of the position sensors $S_P$ of FIG. 1A. Additionally, those of ordinary skill in the art will recognize that the present approach can also reduce instances of unintended acceleration events due to noisy shifts, while helping to ensure sufficient clutch pressure for holding maximum clutch torque without over-pressurizing hardware components of the clutches being controlled. These and other benefits will be evident in light of the foregoing disclosure.

While the best modes for carrying out the invention have been described in detail, those familiar with the art to which this invention relates will recognize various alternative designs and embodiments for practicing the invention within the scope of the appended claims.

The invention claimed is:

1. A system comprising:
   hydraulic fluid;
   an actuatable device that includes a linear actuator, wherein the linear actuator is moveable via the hydraulic fluid to thereby actuate the actuatable device;
   a position sensor operable to measure a position of the linear actuator and output the measured position as a position signal; and
   a controller in electrical communication with the actuatable device and the position sensor, wherein the controller is programmed to:
   transmit a series of respectively increasing and decreasing pressure step commands to the linear actuator;
   generate respective increasing and decreasing position-to-pressure (PTP) curves at a predetermined time using the measured position in response to transmitting the series of respectively increasing and decreasing pressure step commands;
   adjust the increasing and decreasing PTP curves using a calibrated set of offsets;
   locate a PTP point in a hysteresis range between the adjusted increasing and a decreasing PTP curves; and
   control the actuatable device using the located PTP point.

2. The system of claim 1, wherein the actuatable device is a clutch and the linear actuator is a clutch apply piston.

3. The system of claim 2, wherein the system is an automotive transmission.

4. The system of claim 3, wherein the automotive transmission is a dual clutch transmission (DCT), and wherein the clutch is one of two separate input clutches which, when applied, connect the DCT to an engine.

5. The system of claim 1, wherein the calibrated set of offsets includes at least one of a temperature of the hydraulic fluid and a linear velocity of the linear actuator.

6. The system of claim 5, wherein the system is part of a vehicle having an engine, and wherein the calibrated set of offsets includes a speed of the engine, the temperature of the hydraulic fluid, and the linear velocity of the linear actuator.

7. The system of claim 1, wherein the controller is further programmed to construct a baseline set of the increasing and a decreasing PTP curves once every predetermined number N of key cycles of the vehicle, and wherein N>1000.

8. The system of claim 1, wherein the predetermined time is the earlier of a velocity of the linear actuator slowing below a threshold velocity and an expiration of a timer of the controller that measures a duration of each of the increasing and decreasing pressure step commands.

9. A vehicle comprising:
   an engine;
   a transmission;
   an input clutch that selectively connects the engine to the transmission;
   hydraulic fluid;
   a clutch that includes a clutch apply piston, wherein the clutch is an actuatable device that is actuated by the clutch apply piston via the hydraulic fluid;
   a position sensor operable to measure a position of the clutch piston and output the measured position as a position signal; and
   a controller in electrical communication with the actuatable device and the position sensor, wherein the controller is programmed to:
   transmit a series of respectively increasing and decreasing pressure step commands to the clutch apply piston;
   generate respective increasing and decreasing position-to-pressure (PTP) curves at a predetermined time using the measured position in response to transmitting the series of respectively increasing and decreasing pressure step commands;
   adjust the increasing and decreasing PTP curves using a calibrated set of offsets;
   locate a PTP point in a hysteresis range between the adjusted increasing and a decreasing PTP curves; and
   control the actuatable device using the located PTP point.

10. The vehicle of claim 9, wherein the transmission is a dual clutch transmission (DCT), and wherein the input clutch is one of two separate input clutches which, when applied, connect the DCT to the engine.

11. The vehicle of claim 9, wherein the calibrated set of offsets includes at least one of a temperature of the hydraulic fluid and a linear velocity of the clutch piston.

12. The vehicle of claim 11, wherein the calibrated set of offsets includes the temperature of the fluid and the linear velocity of the clutch piston.

13. The vehicle of claim 12, wherein the calibrated set of offsets further includes a speed of the engine.

14. The vehicle of claim 9, wherein the controller is further programmed to construct a baseline set of the increasing and decreasing PTP curves once every predetermined number N of key cycles of the vehicle, and wherein N>1000.

15. The vehicle of claim 9, wherein the predetermined time is the earlier of a velocity of the linear actuator slowing below a threshold velocity and expiration of a timer of the controller that measures a duration of each of the increasing and decreasing pressure step commands.

16. A method for use in a system having hydraulic fluid, an actuatable device that includes a linear actuator moveable via the hydraulic fluid, a position sensor operable to measure a position of the linear actuator and output the measured position as a position signal, and a controller in electrical communication with the actuatable device and the position sensor, the method comprising:
   transmitting a series of respectively increasing and decreasing pressure step commands to the linear actuator;
   generating respective increasing and decreasing position-to-pressure (PTP) curves at a predetermined time using the measured position in response to transmitting the series of respectively increasing and decreasing pressure step commands;
   adjusting the increasing and decreasing PTP curves using a calibrated set of offsets;
   locating a PTP point in a hysteresis range between the adjusted increasing and decreasing PTP curves; and
   controlling the actuatable device using the located PTP point.

17. The method of claim 16, wherein the system is an automotive transmission system, the actuatable device is a clutch, and the linear actuator is a clutch apply piston.

18. The method of claim 16, wherein adjusting the increasing and decreasing PTP curves using a calibrated set of offsets includes adjusting the increasing and decreasing PTP curves using a temperature of the fluid and a linear velocity of the linear actuator.

19. The method of claim 18, wherein adjusting the increasing and decreasing PTP curves using a calibrated set of offsets further includes adjusting the increasing and decreasing PTP curves using a speed of an engine.

20. The method of claim 16, further comprising constructing a baseline set of the PTP curves via the controller once every predetermined number N of key cycles of a vehicle having the system, and wherein N>1000.

* * * * *